US007014248B2

(12) United States Patent
Yokota et al.

(10) Patent No.: US 7,014,248 B2
(45) Date of Patent: Mar. 21, 2006

(54) OPENING AND CLOSING APPARATUS FOR REAR GATE OF VEHICLE

(75) Inventors: Yoshiaki Yokota, Kanagawa (JP); Masahiro Tanigawa, Saitama (JP); Kenichi Munenaga, Saitama (JP)

(73) Assignees: Ohi Seisakusho Co., Ltd., Kanagawa (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/395,120

(22) Filed: Mar. 25, 2003

(65) Prior Publication Data

US 2003/0221371 A1 Dec. 4, 2003

(30) Foreign Application Priority Data

Mar. 25, 2002 (JP) ............................ 2002-083299
Mar. 25, 2002 (JP) ............................ 2002-084163

(51) Int. Cl.
*B60J 5/10* (2006.01)

(52) U.S. Cl. .............................. 296/146.4; 296/146.8; 296/106; 49/341

(58) Field of Classification Search .................. 296/56, 296/146.4, 146.8, 106; 49/341
See application file for complete search history.

(56) References Cited

U.S. PATENT DOCUMENTS 6,382,706 B1 * 5/2002 Yuge et al. .............. 296/146.4
6,398,288 B1 * 6/2002 Yuge ....................... 296/146.4

FOREIGN PATENT DOCUMENTS

| | | |
|---|---|---|
| EP | 1 154 113 | 11/2001 |
| JP | 2000-160929 | 6/2000 |
| JP | 2000-335245 | 12/2000 |
| JP | 2001-132326 | 5/2001 |

(Continued)

OTHER PUBLICATIONS

J.P.O Office Action Jul. 12, 2005.

(Continued)

*Primary Examiner*—Dennis H. Pedder
(74) *Attorney, Agent, or Firm*—Hamre, Schumann, Mueller & Larson, P.C.

(57) ABSTRACT

A rear gate is constructed to be opened and closed by a driving unit installed on a vehicle body side, and the driving unit is constructed to have a motor which can rotate both in normal and reverse directions, a gearbox to which a pinion is pivotally attached for reducing the rotating speed of the motor for output, and a rack adapted to reciprocate in directions normal to an axial direction of a hinge shaft by virtue of the rotation of the pinion and connected to the rear gate at one end thereof. An electromagnetic clutch for connecting and disconnecting a power transmission path between an output shaft of the motor and the pinion is provided in the interior of the gearbox, so that the rack is disposed above or below the gearbox at a position directly above or below the clutch.

5 Claims, 8 Drawing Sheets

FOREIGN PATENT DOCUMENTS

| | | |
|---|---|---|
| JP | 2001-280000 | 10/2001 |
| JP | 2002-188361 | 7/2002 |
| JP | 2003-104060 | 4/2003 |
| JP | 2003-106044 | 4/2003 |
| JP | 2003-106046 | 4/2003 |
| JP | 2003-239621 | 8/2003 |
| JP | 2003-254394 | 9/2003 |
| JP | 2003-262255 | 9/2003 |
| JP | 2003-269039 | 9/2003 |
| JP | 2003-276440 | 9/2003 |
| JP | 2003-276441 | 9/2003 |
| WO | 01/83924 | 11/2001 |

OTHER PUBLICATIONS

J.P.O Office Action Jul. 19, 2005.

* cited by examiner

OPENING AND CLOSING APPARATUS FOR REAR GATE OF VEHICLE

The present application is based on Japanese Patent Applications Nos. 2002-83299 and 2002-84163, the entire contents of which are incorporated herein by reference.

BACKGROUND OF THE INVENTION

1. Field of the Invention

The present invention relates to opening and closing apparatus for opening and closing a rear gate (tail gate) pivotally attached to a vehicle body via a horizontal hinge shaft in such a manner as to open and close freely with a driving unit installed on a side of the vehicle body.

2. Related Art

Among conventional automotive rear gate opening and closing apparatuses, there is an automotive rear gate opening and closing apparatus as shown in FIGS. 5 and 6. FIG. 5 is a side view of a main part of a conventional rear gate opening and closing apparatus, and FIG. 6 is a plan view thereof.

Namely, in the conventional automotive rear gate opening and closing apparatus, a motor 102 which can rotate both in normal and reverse directions, a gearbox 103 in which a pinion 104 for reducing the rotating speed of the motor 102 for output is provided and a driving unit 106 having a rack 105 which meshes with the pinion 104 so as to reciprocate in longitudinal directions are installed within a space formed between a lower surface of a roofpanel 101 and a roof trim, not shown. In addition, a rear end portion of the rack 105 is connected to a rear gate 108 pivotally attached to a vehicle body via a transversely (vertically in FIG. 6) extending hinge shaft 107 in such a manner as to open and close freely, whereby by virtue of the rotation of the pinion 104, the rear gate 108 is made to swing in an opening direction by moving the rack 105 rearward (rightward in FIGS. 5 and 6) and the rear gate 108 is made to swing in a closing direction by moving the rack 105 forward (leftward in FIGS. 5 and 6).

With the conventional opening and closing apparatus as described above, however, the transverse dimension of the overall driving unit 106 is increased due to the motor 102 being connected to one side of the gearbox 103 so as to extend transversely and the rack 105 being supported on the other side of the gearbox 103, and in order to minimize the sacrifice of the space within the passenger compartment, it has been not easy to secure a space for installing the driving unit 106.

In particular, in an opening and closing apparatus in which a clutch, not shown, for connecting and disconnecting a power transmission path between the motor 102 and the pinion 104 is accommodated in the gearbox 103, the transverse dimension of the gearbox 103 is increased, and hence the transverse dimension of the overall driving unit 106 is increased further.

Further, according to the conventional opening and closing apparatus as described above, since the motor 102 is connected to the side of the gearbox 103 at the position closer to the rear end thereof and the pinion 104 is pivotally attached to the longitudinally central portion of the gearbox 103, the motor 102 and part (the rear end portion) of the gear box 103 are interposed between a connecting point a between the rack 105 and the rear gate 108 side and a meshing point b between the rack 105 and the pinion 104. Those constituent members so interposed constitute obstacles and hence need to be spaced away from the rear roof rail constituting the opening in order to avoid the interference therewith, and this results in a construction in which the meshing point b and the connecting point a cannot get closer to each other.

As a result, a distance L1 between the connecting point a and the meshing point b is increased, and hence the overall length of the rack 105 needs to be increased in the longitudinal direction.

However, the longer the overall length of the rack 105 becomes, the easier the rack 105 buckles due to a compressive force applied to the rack 105 when the rack 105 is moved rearward so as to push the rear gate 108 in the opening direction, and therefore, extending the overall length of the rack 105 is disadvantageous in terms of strength.

In addition, the roof trim protrudes to the inside of the passenger compartment by a distance equal to the overall length of the rack 105, and therefore, the space inside the passenger compartment gets narrower.

SUMMARY OF THE INVENTION

The present invention was made in view of the aforesaid situations that were inherent in the related art, and an object thereof is to provide an automotive rear gate opening and closing apparatus which has enabled the reduction in size of the driving unit.

Specifically, the invention is directed to provide an automotive rear gate opening and closing apparatus in which the size in the transverse direction is reduced and the length of the rack is also reduced in an attempt to increase the strength thereof, so that the sacrifice of space within the passenger compartment by attaching the driving unit can be reduced.

According to the invention, the problem is solved as below.

(1) According to a first aspect of the invention, there is provided an opening and closing apparatus for a rear gate pivotally attached to a vehicle body via a horizontal hinge shaft in such a manner as to open and close freely with a driving unit installed on a side of the vehicle body, the opening and closing apparatus comprising:

a motor rotatable both in normal and reverse directions;

a gearbox to which a pinion for reducing a rotating speed of the motor for output is attached, and in an interior of which a clutch for connecting and disconnecting a power transmission path between an output shaft of the motor and the pinion is provided; and a rack adapted to reciprocate in a direction normal to an axial direction of the hinge shaft by a rotation of the pinion and connected to the rear gate at one end thereof;

wherein the rack is disposed above or below the gearbox.

(2) According to the invention, there is provided an opening and closing apparatus as set forth in (1), wherein an output gear adapted to rotate by a rotation of the pinion is pivotally attached to an upper portion or lower portion of the gearbox, and wherein a small-diameter gear portion protruding toward an upper side or lower side of the gearbox is provided on the output gear so that the rack is brought into mesh engagement with the small-diameter gear portion.

(3) According to the invention, there is provided an opening and closing apparatus as set forth in (1), wherein an intermediate gear and an output gear are pivotally attached to the upper portion or lower portion of the gearbox, the intermediate gear meshing with the pinion so as to rotate by the rotation of the pinion and having a small-diameter gear portion at a distal end thereof, the output gear meshing with the small-diameter gear portion of the intermediate gear and having a small-diameter gear portion adapted to mesh with the rack on a side thereof which faces the gearbox.

(4) According to the invention, there is provided an opening and closing apparatus as set forth in the third aspect of the invention, a meshing point between the rack and the small-diameter gear portion of the output gear is located on a gearbox side with respect to a meshing point between the output gear and the intermediate gear.

(5) According to the invention, there is provided an opening and closing apparatus as set forth in (1), wherein the motor is connected to the gearbox at the other end of the gearbox which is an opposite end to one end of the gearbox which faces the rear gate in order for the output shaft of the motor to intersect an axial direction of the hinge shaft orthogonally.

(6) According to the invention, there is provided an opening and closing apparatus for a rear gate pivotally attached to a vehicle body via a horizontal hinge shaft in such a manner as to open and close freely with a driving unit installed on a side of the vehicle body, the opening and closing apparatus comprising:

a motor rotatable both in normal and reverse directions;

a gearbox to which a pinion for reducing the rotating speed of the motor for output is attached; and a rack adapted to reciprocate in directions normal to an axial direction of the hinge shaft by a rotation of the pinion and connected to the rear gate at one end thereof;

wherein the motor is connected to the gearbox at one end of the gearbox which is opposite to another end facing the rear gate;

an output gear adapted to be rotated by the pinion is pivotally provided at a position closer to one end of the gearbox which is facing said rear gate; and the rack is made to mesh with the output gear.

(7) According to the invention, there is provided an opening and closing apparatus as set forth in (6), wherein an intermediate gear for reducing the rotating speed of the pinion for transmission to the output gear is provided between the pinion and the output gear.

(8) According to the invention, there is provided an opening and closing apparatus as set forth in (7), a meshing point between the rack and the small-diameter gear portion of the output gear is located on a gearbox side with respect to a meshing point between the output gear and the intermediate gear.

(9) According to the invention, there is provided an opening and closing apparatus as set forth in (6), wherein an output shaft of the motor intersects an axial direction of the hinge shaft orthogonally.

DETAILED DESCRIPTION OF THE PREFERRED EMBODIMENTS

An embodiment of the invention will be described below with reference to the accompanying drawings.

Figure 1:
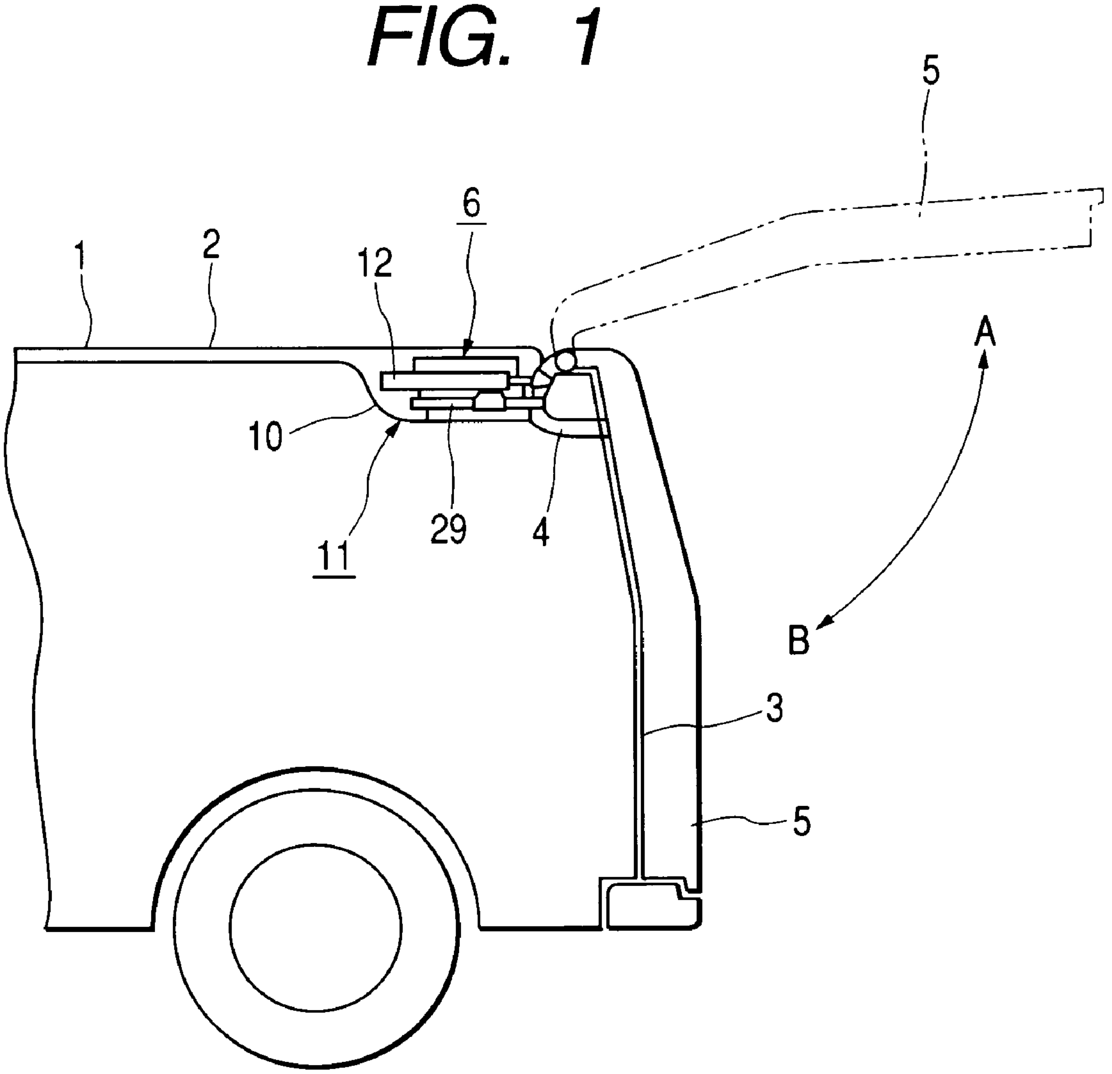
FIG. 1 is a side view of a rear portion of a vehicle body which schematically shows an embodiment of the invention.

FIG. 1 is a side view of a rear portion of a vehicle body which schematically shows the embodiment. Note that in the following description, leftward and rightward in FIG. 1 means "forward" and "rearward", respectively and that leftward and rightward in FIG. 3 means "rearward" and "forward", respectively.

An opening 3 is formed in a rear portion of a vehicle body 1 by left and right rear pillars (not shown) and a rear edge of a roof panel 2, and the opening 3 is designed to be opened and closed by a rear gate 5 pivotally attached to a rear end of the roof panel 2 in such a manner as to rotate in vertical directions via a pair of left and right hinge arms 4.

The rear gate 5 is driven to open and close between a fully closed position illustrated by solid lines and a fully opened position illustrated by double-dashed lines in FIG. 1 by an opening and closing apparatus 6 installed within a space formed between a lower surface of the roof panel 2 and a passenger compartment-side roof trim 10 provided so as to extend below the roof panel 2.

Figure 2:
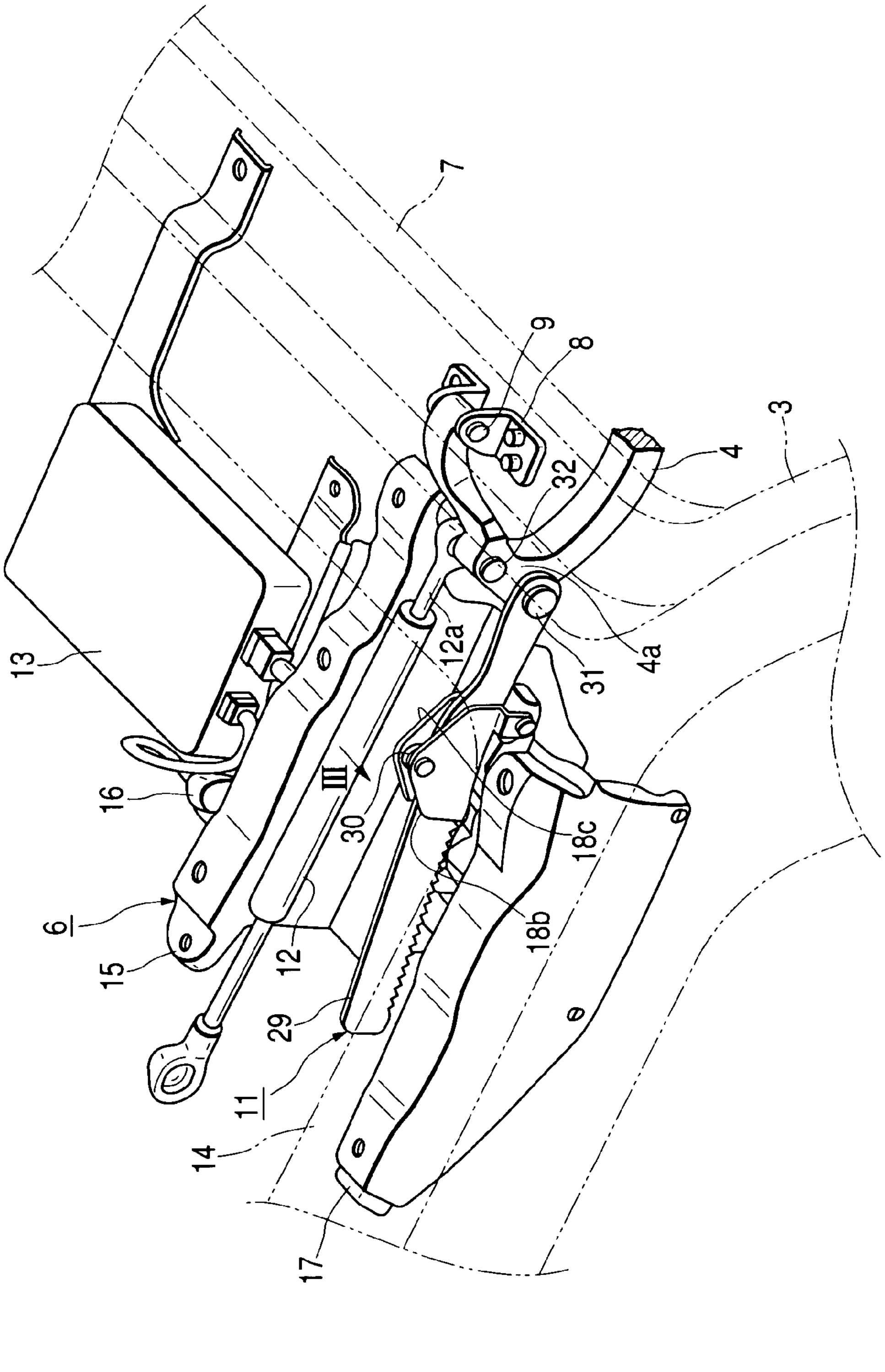
FIG. 2 is a perspective view schematically showing a state in which an opening and closing apparatus is mounted.

FIG. 2 is a perspective view schematically showing a state in which the opening and closing apparatus 6 is mounted within the space.

The hinge arm 4 is pivotally attached to a hinge bracket 8 secured to an upper surface of a rear roof rail 7 extending in a widthwise direction along an upper opening edge of the opening 3 at a proximal end thereof by a hinge shaft 9 oriented transversely (horizontally) and is connected to the rear gate 5 at a rear end portion of a curved portion 4*a* thereof which extends from the proximal end thereof downwardly and forwardly and then extends rearward from a lower end thereof in such a manner as to draw an arc around the hinge shaft 9.

The opening and closing apparatus 6 has a driving unit 11, a gas spring 12 in which gas is sealed, a controller 13, and a mounting bracket 15 fixed with bolts, not shown, to a cross member, not shown, which is provided to extend transversely along lower surfaces of the rear roof rail 7 and the roof panel 2 and a side roof rail 14 extending longitudinally below the roof panel 2, and a temperature sensor 16 is provided on the mounting bracket 15 which temperature sensor is disposed in the vicinity of the gas spring 12 for measuring temperatures around the gas spring 12.

The gas spring 12 is normally biased in a longitudinal extending direction and is made free to extend and contract. A front end portion of the gas spring 12 is pivotally attached to the cross member with a transversely oriented shaft, not shown, and a distal end portion (a rear end portion) of a piston rod 12*a* is pivotally attached to the curved portion 4*a* of the hinge arm 4 with a transversely oriented shaft 32.

Figure 3:
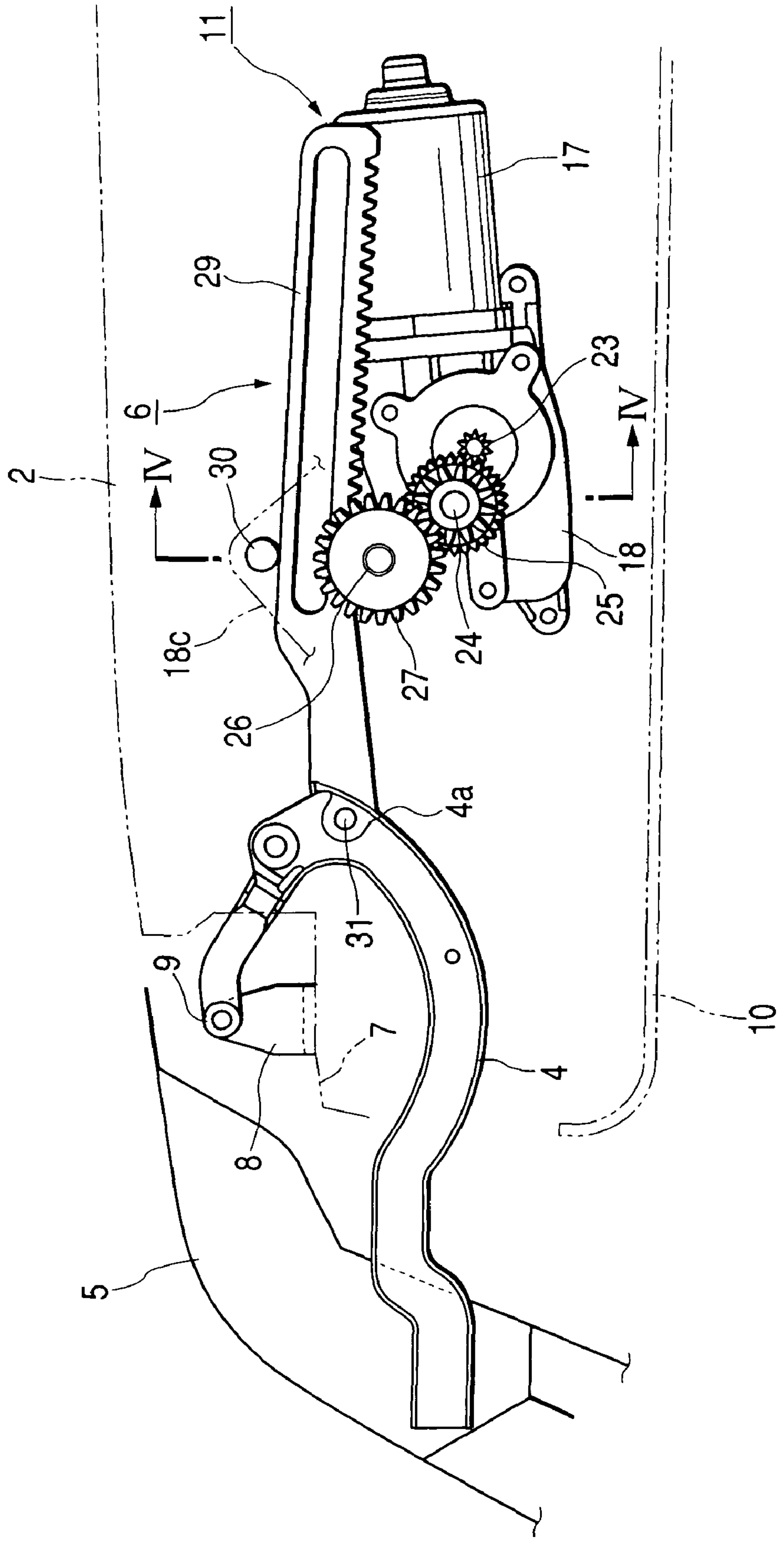
FIG. 3 is a view as viewed in a direction indicated by an arrow III in FIG. 2.
Figure 4:
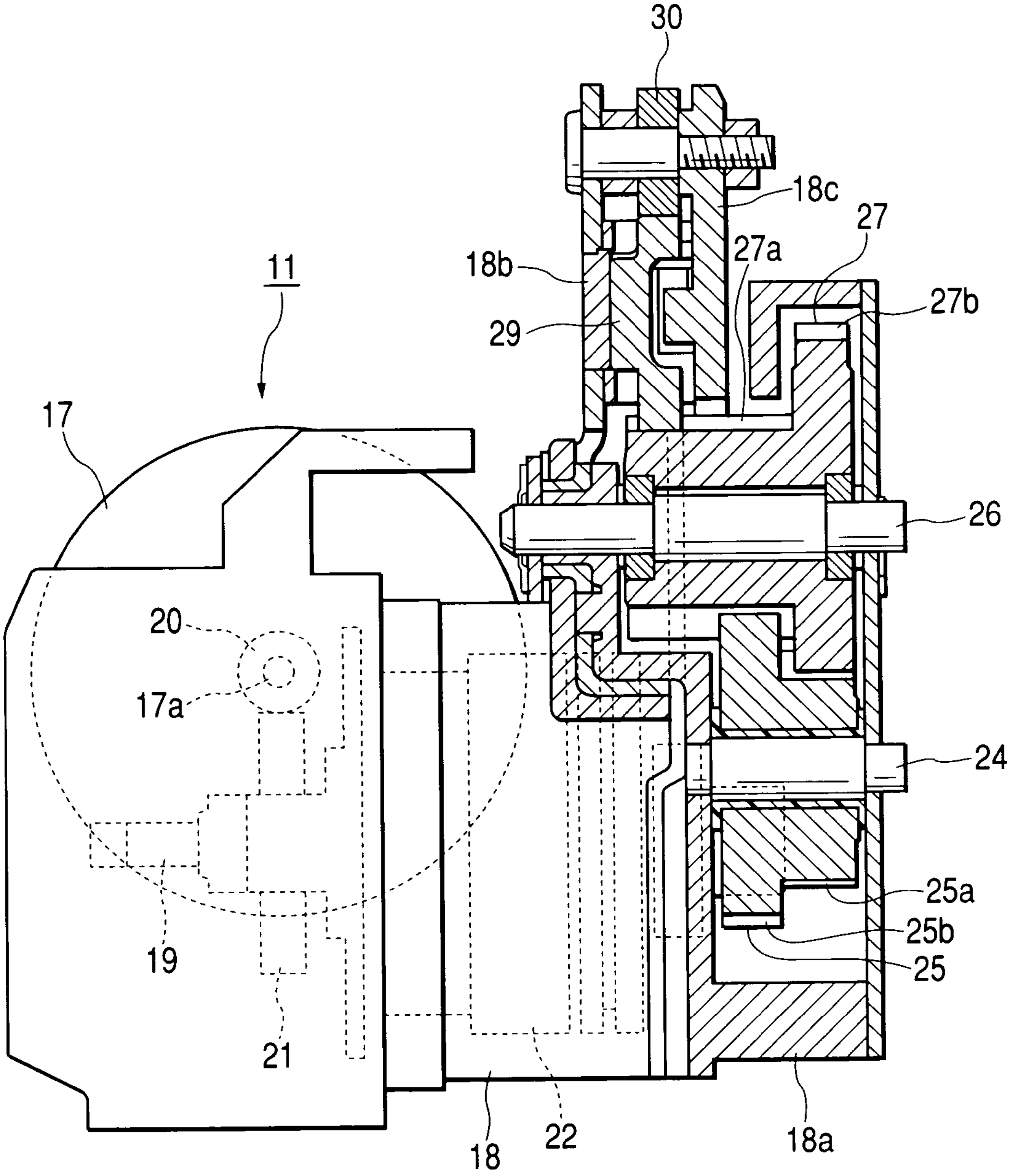
FIG. 4 is a vertical sectional view taken along the line IV—IV in FIG. 3.

FIG. 3 is a view as viewed in a direction indicated by a narrow III in FIG. 2, and FIG. 4 is a vertical sectional view taken along the line IV—IV in FIG. 3. Note that in FIG. 3, the mounting bracket 15 is partially illustrated by a double-dashed line with the remaining portion thereof being omitted.

The driving unit 11 has a motor 17 which can rotate both in normal and reverse directions and which is installed on the mounting bracket 15, a gearbox 18 and a rack 29 which can move in longitudinal directions.

The motor 17 is connected to a front end (an opposite end to an end which faces the rear gate 5) of the gearbox 18 in such a manner that an output shaft 17a thereof is oriented in a direction normal to the axial direction of the hinge shaft 9, or is oriented in the longitudinal direction.

As shown in FIG. 4, accommodated in the interior of the gearbox 18 are a worm wheel 21 pivotally supported on a shaft 19 oriented transversely and meshing with a worm 20 fixedly attached to the output shaft 17a of the motor 17, an electromagnetic clutch 22 installed on the same shaft 19 as that on which the worm wheel 21 is pivotally supported and adapted to connect and disconnect a power transmission path between the output shaft 17a of the motor 17 and a pinion 23, which will be described later, and an encoder, not shown, for detecting the rotation of the worm wheel 21.

As shown in FIG. 3, provided on an external surface side of the gearbox 18 are the pinion 23 connected to a shaft on an output side of the electromagnetic clutch 22, an output gear 27 pivotally supported by a transversely oriented shaft 26 at a position which is situated rearward and diagonally upward of the pinion 23 and closer to a rear end of the gearbox 18 on an upper portion thereof, and an intermediate gear 25 pivotally supported by a transversely oriented shaft 24 between the pinion 23 and the output gear 27 and meshing with the pinion 23 and the output gear 27 so as to reduce the rotating speed of the pinion 23 for transmission of the rotation of the pinion 23 so reduced to the output gear 27.

Note that the intermediate gear 25 and the output gear 27 are pivotally supported between a mounting bracket 18a fixed to the external surface of the gearbox 18 and a cover plate 28.

As shown in FIG. 4, a small diameter gear portion 27a protruding toward the gearbox 18 side is provided on an internal surface of the output gear 27 so as to be situated above the gearbox 18. The rack 29 is brought into mesh engagement with the small diameter gear portion 27a from above so that the rack 29 can reciprocate in directions normal to the axial direction of the hinge shaft 9, or in the longitudinal directions by virtue of the rotation of the small diameter gear portion 27a.

A meshing point between the rack 29 and the small diameter gear portion 27a of the output gear 27 is located on a gearbox side with respect to a meshing point between the output gear 27 and the intermediate gear 25.

The rack 29 is pivotally attached to the curved portion 4a of the hinge arm 4 at a rear end portion thereof by a transversely oriented shaft 31 and is guided so as to slide in longitudinal directions at a portion directly above the electromagnetic clutch 22 above the gearbox 18 by left and right support portions 18b, 18c provided on the mounting bracket 18a and a guide member 30 rotatably supported between the support portions 18b, 18c.

The support portion 18b, 18c hold sides of the rack 29 therebetween so as to allow the rack 29 to slide while in contact with the support portions 18b, 18c, and the guide member 30 slidably contacts an upper edge of the rack 29 so as to slidably hold the rack 29 between the guide member 30 and the small diameter gear portion 27a of the output gear 27.

Note that the guide member 30 according to the embodiment is constituted by a ball bearing which is used as a roller.

As is described above, the motor 17 is connected to the front end of the gearbox 18 in such a manner that the output shaft 17a thereof is oriented in the longitudinal direction, and the output gear 27 is pivotally attached to the rear end upper portion of the gearbox 18, whereby since the motor 17 and the gearbox 18 are allowed not to be interposed between the shaft 31 which is a connecting point between the rack 29 and the hinge arm 4 and a meshing point between the rack 29 and the output gear 27, an interval between the shaft 31 and the meshing point is narrowed and the length of the rack 29 can be shortened.

In addition, the rack 29 is disposed so as to reciprocate in the longitudinal directions at the portion directly above the electromagnetic clutch 22 above the gearbox 18, whereby since the rack 29 is prevented from protruding outwardly from the side surface of the gearbox 18, the transverse dimension of the driving unit 11 can be reduced, thereby making it possible to reduce the size of the driving unit 11 in the transverse direction. Thus, the interior of the passenger compartment can be expanded.

As shown in FIG. 4, the intermediate gear 25 having a small diameter gear portion 25a and a large diameter gear portion 25b and the output gear 27 having the small diameter gear portion 27a and a large diameter gear portion 27b are assembled together such that the large diameter gear portions alternately mesh with the small diameter gear portions, whereby the width and height of the output gear 27 and the intermediate gear 25 which are in a meshing condition are reduced, thereby making it possible to miniaturize the gearbox 18.

Next, the operation of the embodiment will be described.

With the rear gate 5 being situated at the fully closed position, when the controller 13 receives a signal indicating an opening operation from a remote control switch, not shown, the electromagnetic clutch 22 is energized and connects the power transmission path between the output shaft 17a of the motor 17 and the pinion 23, and the motor 17 is controlled to rotate in the normal direction.

When the motor 17 normally rotates, the rack 29 is moved rearward from the fully closed position shown in FIG. 3 via the worm 20, worm wheel 21, the electromagnetic clutch 22, the pinion 23, the intermediate gear 25 and the output gear 27, whereby the rear gate 5 is made to swing in the opening direction (in a direction indicated by an arrow A shown in FIG. 1) via the hinge arm 4 and then stops at the fully opened position.

When the rear gate 5 is made to swing in the opening direction, a longitudinal compressive force is applied to the rack 29. However, since the length of the rack 29 can be shortened, it is possible to prevent the unreasonable buckling of the rack 29.

With the rear gate 5 being situated at the fully opened position, when the controller 13 receives a signal indicating a closing operation from the remote control switch, the electromagnetic clutch 22 is energized, and the motor 17 is controlled to rotate in reverse, whereby the rack 29 is moved forward via the worm 20, the worm wheel 21, electromagnetic clutch 22, the pinion 23, the intermediate gear 25, and the output gear 27, and the rear gate 5 is made to swing in the closing direction (a direction indicated by an arrow B shown in FIG. 1) and stops at the fully closed position.

While the one embodiment of the invention has been described heretofore, various modifications and changes can be made to the embodiment without departing from the spirit and scope of the invention.

Figure 3A:
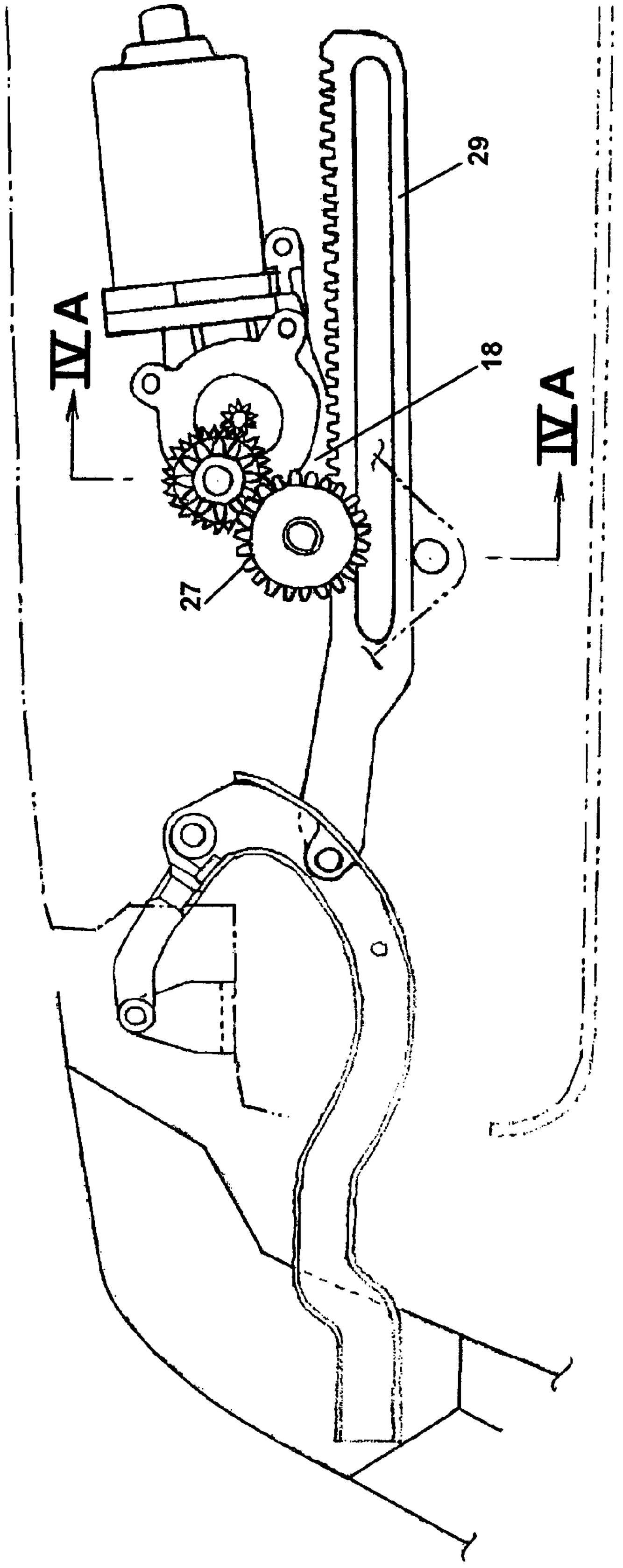
FIG. 3A is a side view of another embodiment of an opening and closing apparatus.
Figure 4A:
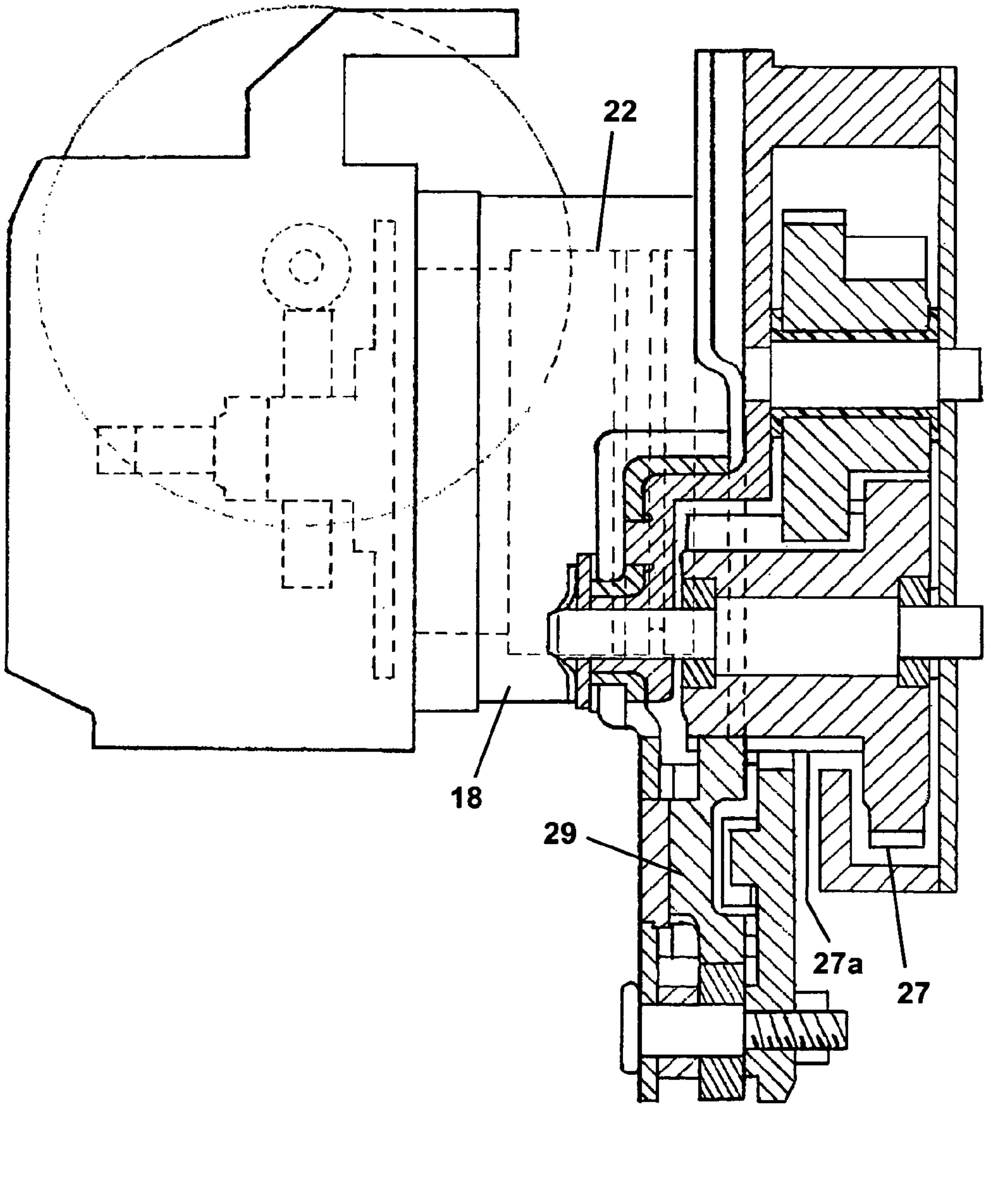
FIG. 4A is a vertical sectional view taken along the line IVA—IVA in FIG. 3A.
Figure 5:
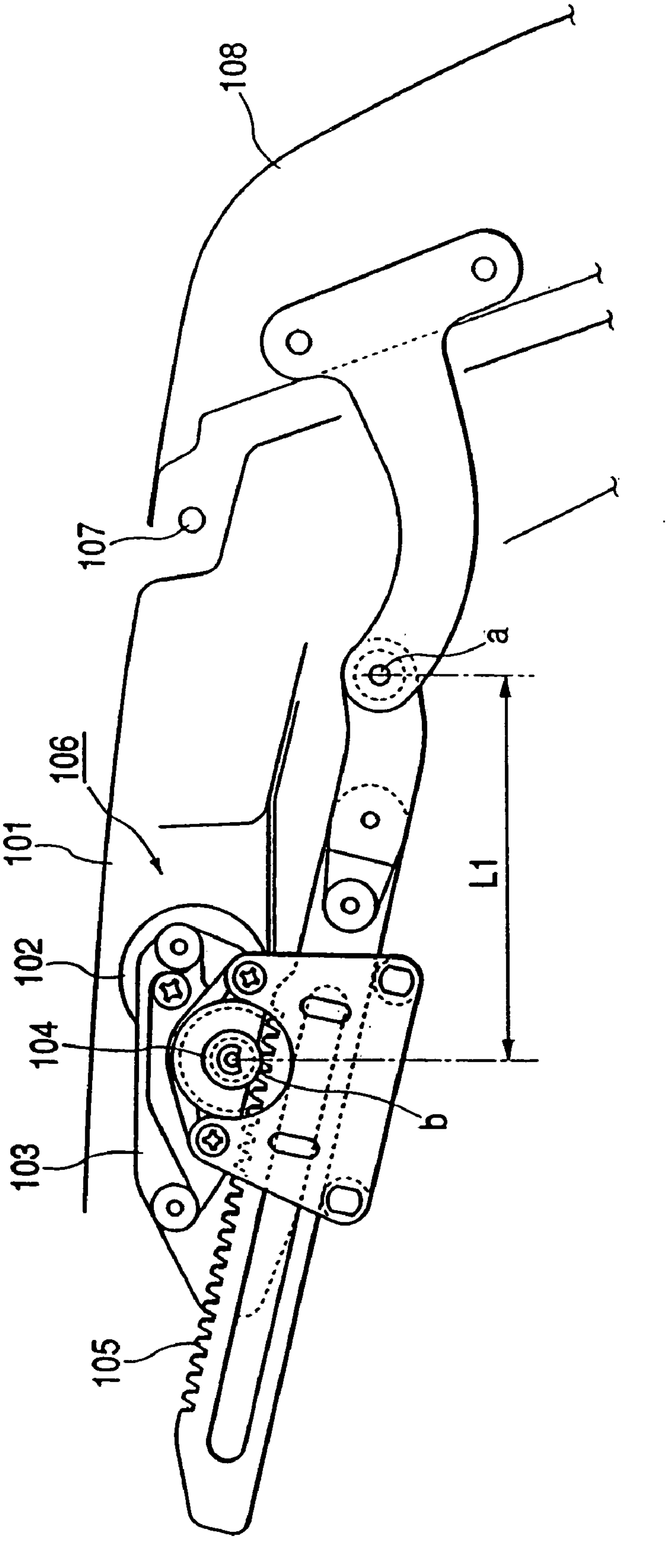
FIG. 5 (PRIOR ART)
FIG. 5 is a side view showing a main part of a related art.
Figure 6:
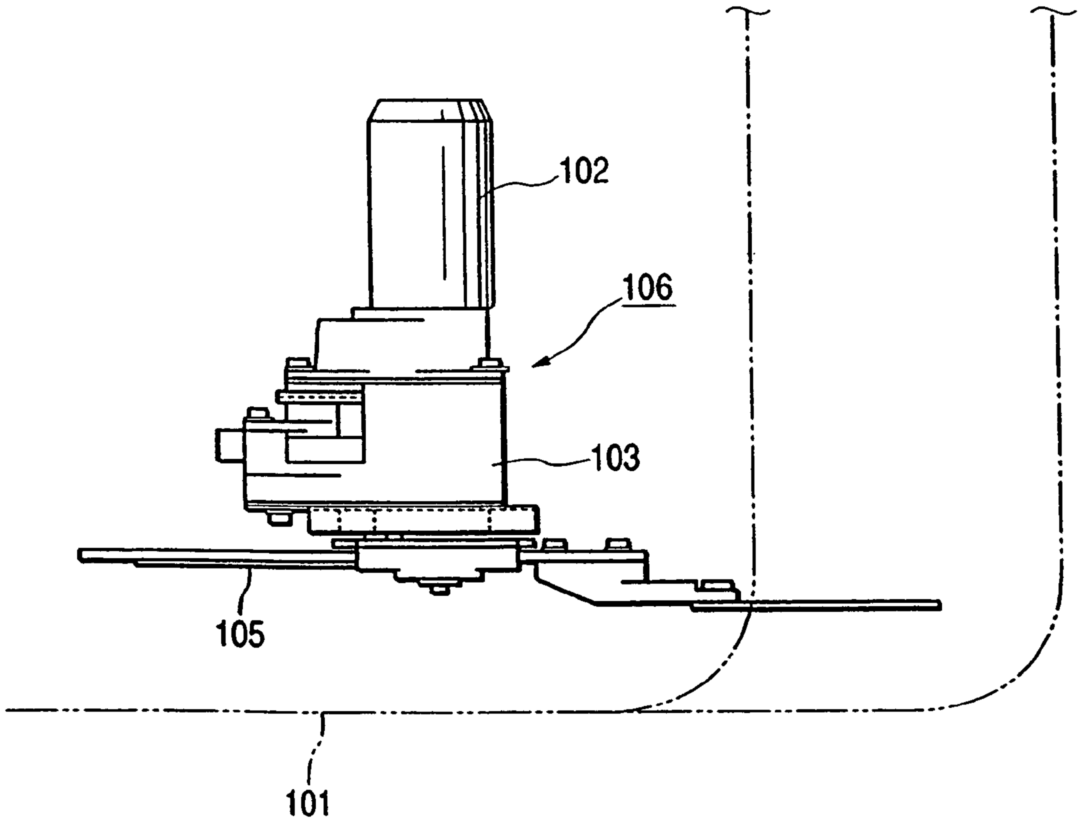
FIG. 6 (PRIOR ART)
FIG. 6 is a plan view showing the main part of the related art.

For example, the following modification may be possible: the output gear 27 is pivotally supported at a rearward lower portion of the gearbox 18, and the rack 29 is made to mesh with the small diameter gear portion 27a from a lower side of the output gear 27, so that the rack 29 is disposed below the gearbox 18 at a position directly below the electromagnetic clutch 22. See FIGS. 3A and 4A.

According to the invention, the following advantages can be provided.

(a) According to the invention, the clutch for connecting and disconnecting the power transmission path between the output shaft of the motor and the pinion is provided in the interior of the gearbox, and the rack is disposed above or below the gearbox at the position directly above or below the clutch, whereby the size of the driving unit can be attempted to be reduced in the transverse direction (the axial direction of the hinge shaft).

(b) According to the invention, the output gear which can rotate by virtue of the rotation of the pinion is pivotally attached to the upper portion or lower portion of the gearbox, and the small diameter gear portion protruding toward the upper or lower side of the gearbox is provided on the output gear, so that the rack meshes with the small diameter gear portion, whereby the rack can be disposed above or below the gearbox with a simple construction.

(c) According to the invention, the intermediate gear and the output gear which each have the small diameter gear portion and the large diameter gear portion are assembled together such that the large diameter gear portions and the small diameter gear portions alternately mesh with each other, whereby the width and height of the gears are reduced, thereby making it possible to miniaturize the gearbox.

(d) According to the invention, the motor is connected to the other end of the gearbox which is the opposite end to the one end thereof which faces the rear gate, whereby the driving unit can be made smaller in size in the transverse direction.

(e) According to the invention, the motor is connected to the gearbox at the other end of the gearbox which is an opposite end to one end of the gearbox which faces the rear gate, the output gear adapted to be rotated by the pinion is pivotally attached to the gearbox at the position closer to one end thereof, and the rack is made to mesh with the output gear, whereby the interval between the meshing point between the rack and the output gear and the connecting point between the rack and the hinge arm is narrowed so as to shorten the length of the rack to thereby attempt to increase the strength thereof.

(f) According to the invention, the intermediate gear for reducing the rotating speed of the pinion for transmission to the output gear is provided between the pinion and the output gear, the rotating speed of the output gear is reduced so that the output gear can be disposed closer to the rear end of the gearbox.

(g) According to the invention, the motor is connected to the gearbox at the other end of the gearbox which is the opposite end to one end of the gearbox which faces the rear gate in such a manner that the output shaft of the motor intersects the axial direction of the hinge shaft orthogonally, the driving unit can be made small in size in the transverse direction (the axial direction of the hinge shaft).

(h) According to the invention, a meshing point between the rack and the small-diameter gear portion of the output gear is located on a gearbox side with respect to a meshing point between the output gear and the intermediate gear, whereby the size of the driving unit can be attempted to be reduced in the transverse direction (the axial direction of the hinge shaft).

What is claimed is:

1. An opening and closing apparatus for a rear gate pivotally attached to a vehicle body via a horizontal hinge shaft in such a manner as to open and close freely with a driving unit installed on a side of said vehicle body, said opening and closing apparatus comprising:

a motor rotatable both in normal and reverse directions;

a gearbox to which a pinion for reducing a rotating speed of said motor for output is attached, and in an interior of which a clutch for connecting and disconnecting a power transmission path between an output shaft of said motor and said pinion is provided, the gear box including an intermediate gear having a small-diameter gear portion and a large-diameter gear portion, and an output gear having a small-diameter gear portion and a large-diameter gear portion, the intermediate gear and the output gear being assembled such that the large-diameter gear portion of the intermediate gear meshes with the small-diameter gear portion of the output gear and the small-diameter gear portion of the intermediate gear meshes with the large-diameter gear portion of the output gear; and a rack adapted to reciprocate in directions normal to an axial direction of said hinge shaft by a rotation of said pinion and connected to said rear gate at one end thereof;

wherein said rack is disposed one of at least partially above and below said gearbox, and wherein the rack is disposed on a same side surface as the gearbox.

2. An opening and closing apparatus as set forth in claim 1, wherein the output gear is adapted to rotate by the rotation of said pinion and is pivotally attached to a portion of said gearbox, and wherein the small-diameter gear portion of the output gear protrudes toward a side of said gearbox so that said rack is brought into mesh engagement with said small-diameter gear portion of the output gear.

3. An opening and closing apparatus as set forth in claim 1, wherein the intermediate gear and the output gear are pivotally attached to said gearbox, said intermediate gear meshing with said pinion so as to rotate by the rotation of said pinion, said output gear meshing with said small-diameter gear portion of said intermediate gear, and the small-diameter gear portion of the output gear meshing with said rack on the side thereof which faces said gearbox.

4. An opening and closing apparatus as set forth in claim 1, wherein a meshing point between said rack and the small-diameter gear portion of said output gear is located on a gearbox side with respect to a meshing point between said output gear and an intermediate gear.

5. An opening and closing apparatus as set forth in claim 1, wherein said motor is connected to said gearbox at the other end of said gearbox which is an opposite end to one end of said gearbox which faces said rear gate in order for said output shaft of said motor to intersect an axial direction of said hinge shaft orthogonally.

* * * * *